(12) United States Patent
Sanford et al.

(10) Patent No.: US 10,370,261 B2
(45) Date of Patent: Aug. 6, 2019

(54) SYSTEM AND METHOD FOR TRANSPORTATION AND DESALINATION OF A LIQUID

(71) Applicant: MHD Technology Corporation, Goshen, NY (US)

(72) Inventors: Allan Sanford, Wurtsboro, NY (US); Fazle Hussain, Lubbock, TX (US); Christopher Bryson, Lubbock, TX (US)

(73) Assignee: MHD Technology Corporation, Orlando, FL (US)

( * ) Notice: Subject to any disclaimer, the term of this patent is extended or adjusted under 35 U.S.C. 154(b) by 76 days.

(21) Appl. No.: 15/339,872

(22) Filed: Oct. 31, 2016

(65) Prior Publication Data
US 2017/0120253 A1    May 4, 2017

Related U.S. Application Data (60) Provisional application No. 62/285,458, filed on Oct. 30, 2015.

(51) Int. Cl.
*C02F 1/00* (2006.01)
*C02F 1/48* (2006.01)
(Continued)

(52) U.S. Cl.
CPC .............. *C02F 1/006* (2013.01); *C02F 1/004* (2013.01); *C02F 1/008* (2013.01);
(Continued)

(58) Field of Classification Search
CPC ..... B03C 1/023; B03C 1/288; B03C 2201/18; B01D 21/0018; B01D 15/08; B01D 21/34;
(Continued)

(56) References Cited

U.S. PATENT DOCUMENTS 3,135,208 A * 6/1964 Stuetzer ................ H02K 44/04
                                                            310/11
3,376,440 A    4/1968 P
(Continued)

FOREIGN PATENT DOCUMENTS

DE      102012205674 A1   10/2013

OTHER PUBLICATIONS

Al-Habahbeh et al; Review of magnetohydrodynamic pump applications; Alexandria Engineering Journal; vol. 55, No. 2, pp. 1347-1358; Mar. 24, 2016; pp. 1348, 1350-1353.
(Continued)

*Primary Examiner* — David C Mellon
(74) *Attorney, Agent, or Firm* — Steven H. Washam; Washam PLLC (57) ABSTRACT

The improved liquid transportation and desalination system transports seawater or other saline liquids through a piped distribution system with essentially no moving parts by relying on MHD principles. A fluid pump device comprised of high-strength permanent magnets forming chambers through which the liquid passes and inter-chamber opposing electrode plates with an applied DC potential provide the magnetic flux density and electric current for generating the Lorentz forces acting on the liquid. The fluid pump device may be combined with a desalination filtration device for provision of fresh water near the end of the distribution line without the need for a largescale treatment plant. Desalination/filtration occurs through use of nano-porous graphene and/or carbon nanotube media.

17 Claims, 7 Drawing Sheets

(51) Int. Cl.
- C02F 1/461 (2006.01)
- H02K 44/08 (2006.01)
- H02K 44/12 (2006.01)
- C02F 103/08 (2006.01)

(52) U.S. Cl.
CPC .......... *C02F 1/46109* (2013.01); *C02F 1/482* (2013.01); *H02K 44/085* (2013.01); *H02K 44/12* (2013.01); *C02F 2001/46152* (2013.01); *C02F 2103/08* (2013.01); *C02F 2201/009* (2013.01); *C02F 2201/4617* (2013.01); *C02F 2201/46125* (2013.01); *C02F 2201/46145* (2013.01); *C02F 2209/03* (2013.01); *C02F 2209/40* (2013.01); *C02F 2303/24* (2013.01); *C02F 2305/08* (2013.01); *Y02A 20/212* (2018.01)

(58) Field of Classification Search
CPC .. B01D 21/0009; C02F 1/46109; C02F 1/283; C02F 1/482; C02F 1/008; C02F 1/006; C02F 2209/40; C02F 2103/08; C02F 2001/46152; C02F 2209/03; C02F 1/481; C02F 2201/48; H02K 44/02; H02K 44/12; H02K 41/0354; H02K 41/031

See application file for complete search history.

(56) References Cited

U.S. PATENT DOCUMENTS

| | | | |
|---|---|---|---|
| 3,432,941 A | 3/1969 | Isaac | |
| 4,749,890 A | 6/1988 | Houston | |
| 4,906,877 A * | 3/1990 | Ciaio | H02K 44/04 310/11 |
| 5,021,397 A | 6/1991 | Vellego et al. | |
| 5,196,085 A | 3/1993 | Szekely et al. | |
| 5,221,471 A | 6/1993 | Huntley | |
| 5,347,186 A | 9/1994 | Konotchick | |
| 5,369,992 A * | 12/1994 | Meng | G01M 10/00 73/148 |
| 5,925,324 A * | 7/1999 | Greer | A23L 3/01 422/186.03 |
| 6,183,206 B1 | 2/2001 | Valenzuela et al. | |
| 2005/0263456 A1* | 12/2005 | Cooper | A61L 2/0082 210/660 |
| 2009/0173691 A1 | 7/2009 | Oklejas | |
| 2012/0048804 A1* | 3/2012 | Stetson | B01D 61/02 210/653 |
| 2015/0219122 A1* | 8/2015 | Vetrovec | F04F 1/06 417/410.1 |

OTHER PUBLICATIONS

J-WAFS; Low Carbon Desalination; Report of a workshop conducted at MIT in association with the Global Clean Water Desalination Alliance; Oct. 17, 2016; retrieved online on Feb. 16, 2017 at https://jwafs.mit.edu/node/66; pp. 8-9, 32-33, 35-37, 39, 68.

K&J Magnetics, Inc.; Magnet Grades; Oct. 25, 2015; retrieved online on Feb. 16, 2017 at http://web.archive.org/web/20151225132213/http://www.kjmagnetics.com/blog.asp?p=magnet-grade; p. 1.

USPTO PCT ISA; International Search Report; PCT/US16/68549; dated Apr. 7, 2017.

USPTO PCT ISA; Search History for related PCT application; PCT/US16/68549; dated Apr. 7, 2017.

USPTO PCT ISA; Written Opinion of the International Searching Authority; PCT/US16/68549; dated Apr. 7, 2017.

Wikipedia; Neodymium magnet; Oct. 29, 2016; retrieved online on Feb. 15, 2017 at https://en.wikipedia.org/w/index.php?=title=Neodymium_magnet&oldid=746844338; pp. 1, 3.

Takezawa, Setsuo et al.; Operation of the Thruster for Superconducting Electromagnetohydrodynamic Propulsion Ship "YAMAMOTO 1"; Bulletin of the Mechanical Engineering Scientific Journal; Mar. 1995; vol. 23 No. 1; United States of America.

* cited by examiner

SYSTEM AND METHOD FOR TRANSPORTATION AND DESALINATION OF A LIQUID

CROSS-REFERENCE TO RELATED APPLICATIONS

This application claims the benefit of U.S. provisional patent application Ser. No. 62/285,458, filed Oct. 30, 2015.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates to liquid transport and desalination technology and, more specifically, to methods and systems for bulk seawater transportation and desalination.

Description of Related Art Including Information Disclosed Under 37 CFR 1.97 and 1.98

Fresh water is a precious resource, vital to the health of humankind. Unfortunately, growing populations and the increased need for water stress the existing natural sources of fresh water so severely that existing aquifers are being depleted. Substantial backup water resources are available in the form of seawater, but must first be desalinated to be useful for cooking, consumption, and irrigation. However, present means for desalinating water is uneconomical and does not scale well. Moreover, desalination typically takes place near coastal areas and the resulting fresh water must be transported long distances inland for use.

Long distance transportation of fresh water in quantities necessary to sustain large populations can be inefficient and costly. This transportation may include use of tractor-trailers water tank trucks, or may include overland piping systems to facilitate movement of the resulting fresh water. Unattended freshwater pipelines also increase the possibility of water theft, especially in drought stricken regions.

Overland water supply pipeline systems are more efficient for movement of large quantities of water, but such systems typically require numerous pumping stations along the various routes to maintain adequate water pressure. These pumping stations commonly utilize centrifugal and/or positive-displacement pumps that are costly, consume substantial energy, and require continuous maintenance due to the numerous moving parts and constant impingement with the liquid. Moreover, unless the liquid being pumped is non-corrosive (for example, fresh water) the materials chosen for such pumps must be able to withstand highly corrosive substances. This further increases the cost of production and operation of such systems.

The transportation of seawater or other high-salinity liquids is not economical and is impractical with current systems due to the corrosion factor with existing pumping technology. Consequently, such liquids must be desalinated close to the source with the resultant fresh water transported to inland regions. However, existing pipelines only transport a limited distance and cannot efficiently reach most drought stricken regions.

The present invention references the work of Takezawa, et al. as described in their work entitled, *Operation of the Thruster for Superconducting Electromagnetohydrodynamic Propulsion Ship "YAMAMOTO 1"*, which was published in the March 1995 volume of the Mechanical Engineering Scientific Journal, and which is incorporated herein by reference for all necessary purposes. Takezawa, et al. presented proof that an oceangoing ship could be propelled by magnetohydrodynamic (MHD) thrusters. The MHD thrusters utilized by Takezawa, et al. required use of superconducting electromagnets and necessary support structure to generate sufficient magnetic flux to achieve the desired Lorentz force. The present invention relies on the basic underlying principles of physics leveraged by Takezawa, et al., but does so with an entirely unique structure and purpose that does not require superconductivity and the attendant costs and complexities of such systems. The resultant liquid transport technology described and claimed herein effectively contains no moving parts, and would not be subject to ongoing maintenance issues encountered with existing liquid transport technologies.

Further, desalinating high-salinity liquids is currently inefficient and costly when performed in bulk. For example, desalination plants relying on steam distillation encounter tremendous maintenance efforts due to scaling of the distillation components and require enormous energy to operate. Likewise, plants utilizing reverse osmosis technology require enormous energy to push water through the reverse osmosis polyamide membranes. Thus the current combination of inefficient pumping technology and inefficient desalination/filtration technology makes utilization of saltwater for conversion to freshwater out of reach for use by drought stricken regions. The present invention solves these problems and others, as will be understood by one of ordinary skill following a detailed reading and understanding of the accompanying figures, detailed disclosure, and claims.

BRIEF SUMMARY OF THE INVENTION

The present invention may be realized in multiple embodiments. In a first embodiment the invention provides a system for transporting and desalinating a liquid, the system comprising: a saline liquid intake device in fluid communication at least one fluid pump device, the fluid pump device comprising at least one chamber through which the saline liquid may flow, the fluid pump device capable of generating a non-impinging motive force to effect the movement and transport of the liquid therethrough.

In yet another embodiment the fluid pump device further comprises: an inflow manifold adapted to smooth the turbulence of the liquid entering the fluid pump and/or an outflow manifold adapted to smooth the turbulence of the liquid exiting the fluid pump device. In yet another embodiment the fluid pump device further comprises: a permanent magnet array arranged to form at least one chamber therein through which the saline liquid is transported, the permanent magnet array further arranged such that the resulting magnetic field direction within the chamber is substantially perpendicular to the direction of liquid transport; and an electrode plate array arranged within the chamber such when a DC potential is applied therebetween the resulting electric current density direction is substantially perpendicular to the magnetic field direction and the direction of liquid transport.

In another embodiment the fluid pump device further comprises: a permanent magnet array of at least approximately N52 strength or greater, the permanent magnet array arranged to form at least one chamber therein through which the saline liquid is transported, the permanent magnet array further arranged such that the resulting magnetic field direction within the chamber is substantially perpendicular to the direction of liquid transport; and an electrode plate array arranged within the chamber such when a DC potential is applied therebetween the resulting electric current density direction is substantially perpendicular to the magnetic field direction and the direction of liquid transport.

In yet another embodiment the fluid pump device further comprises: a neodymium permanent magnet array arranged to form at least one chamber therein through which the saline liquid is transported, the permanent magnet array further arranged such that the resulting magnetic field direction within the chamber is substantially perpendicular to the direction of liquid transport; and an electrode plate array arranged within the chamber such when a DC potential is applied therebetween the resulting electric current density direction is substantially perpendicular to the magnetic field direction and the direction of liquid transport.

Still another embodiment of the fluid pump device further comprises: an N52 or stronger neodymium permanent magnet array arranged to form at least one chamber therein through which the saline liquid is transported, the permanent magnet array further arranged such that the resulting magnetic field direction within the chamber is substantially perpendicular to the direction of liquid transport; and an electrode plate array arranged within the chamber such when a DC potential is applied therebetween the resulting electric current density direction is substantially perpendicular to the magnetic field direction and the direction of liquid transport.

In another embodiment the fluid pump device further comprises: a desalination device for substantially reducing the salinity of the transported liquid as the liquid flows therethrough. Control of the device is also envisioned. In another embodiment the fluid pump device further comprises: a monitoring system for adjusting a chamber dimension and/or an electrical current field strength in response to a saline liquid transportation characteristic to establish a desired saline liquid flow rate and/or flow pressure.

With regard to the desalination device, the desalination device further comprises a graphene membrane or a carbon nanotube membrane through which the transported liquid flows. In another embodiment the desalination device further comprises a brine recovery outlet for removing brine produced through the desalination process.

Methods of use of the unique system as described herein are also envisioned. In particular, a method for transporting and desalinating a liquid is presented, with the method steps comprising: with at least one fluid pump device, imparting a motive force on a saline liquid through non-impinging means, whereby the liquid is forcibly transported through at least one chamber of the fluid pump device and through a piping system. In other embodiments the method steps further comprise: providing a permanent magnet array arranged around the chamber such that the resulting magnetic field direction within the chamber is substantially perpendicular to the direction of the liquid transport. In another embodiment the method steps further comprise: providing a permanent magnet array arranged around the chamber such that the resulting magnetic field direction within the chamber is substantially perpendicular to the direction of the liquid transport; and applying a DC potential across an electrode plate array arranged within the chamber such that the resulting electric current density field direction is substantially perpendicular to the magnetic field direction and the direction of the liquid transport.

In yet another embodiment, the method steps further comprise: substantially reducing the salinity of the transported liquid through use of a desalination device. In another embodiment the method steps further comprise: substantially reducing the salinity of the transported liquid through use of a desalination device, wherein the desalination device comprises a graphene filtration and/or a carbon nanotube membrane; or recovering the desalination brine for subsequent use. Another embodiment includes the method steps further comprising: monitoring at least one saline liquid transportation characteristic and adjusting a chamber dimension and/or an electrical current field strength in response to the saline liquid transportation characteristic to establish a desired saline liquid flow rate and/or flow pressure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein.

The above figures are provided for the purpose of illustration and description only, and are not intended to define the limits of the disclosed invention. Use of the same reference number in multiple figures is intended to designate the same or similar parts. Furthermore, if and when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

Figure 1:
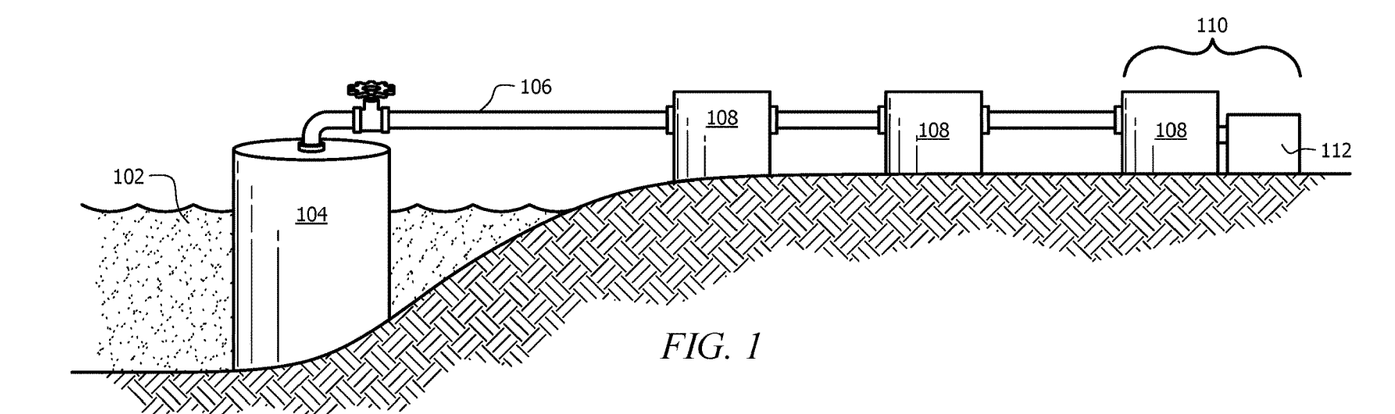
FIG. 1 is a high-level depiction of a municipal water delivery and processing system incorporating an embodiment of the liquid transport and desalination system in accordance with the present invention and as described and claimed herein.

To place the invention in context in order to appreciate its utility, it is helpful to describe an embodiment of a complete system within which the component devices operate. Turning to the drawings for such guidance, FIG. 1 presents a high-level depiction of a municipal water delivery and processing system incorporating an embodiment of the liquid transport and desalination system in accordance with the present invention and as described and claimed herein. The invention is useful in transporting saline liquids, which are sensitive to the forces generated by the MHD pump system described and claimed below. In this instance seawater (102) is the saline liquid of interest. A pre-filtration and treatment structure (104) is provided to pre-filter and treat the coastal seawater (102) before induction into the transport system. This pre-filtration and treatment prepares the water upon entry, and may include a coarse filter for removal of debris both large and small, chemical treatment to kill pathogens and/or algae and to soften the water by removal of excess calcium, additives for reducing surface friction within the piping, or some combination thereof. Such pre-filtration and treatment is within the skill of one of ordinary skill and is readily practiced. Moreover, the piping and structure materials are in common use with modern municipal water delivery systems and need no further description herein.

To provide an idea of scale of such systems, a typical water main pipeline is upwards of 48 inches in diameter. A length of water main pipe (106) places a plurality of fluid pump devices (108) in fluid communication with one another and with the pre-filtration and treatment structure (104). At the destination of the delivery pipe is a fluid pump device (108) in combination with a desalination device (112) to form a combined liquid transport and desalination system (110). While it is possible to utilize a single fluid pump device and desalination device to achieve the desire goal, the number of fluid pump devices (108) required is determined by the distance over which the piping system must travel as well as geographic features along the route. For example, if the distance is relatively short but the terrain is steep and uneven, it may be necessary to strategically place additional fluid pump devices (108) along the route to maintain adequate saline liquid flow pressure and flow rate. Use of common flow measurements and overall system functional observation will provide adequate input to one of ordinary skill to make this determination.

Strategic use of surface coatings will reduce or eliminate the buildup of salt deposits within the pipeline, and improve the friction coefficient such that saline liquid flows more readily therethrough. For example, it is possible to coat the inner surfaces in contact with the saline liquid with boron-aluminum-magnesium (BAM) ceramic alloy to create an extremely hard, low friction, surface, which will reduce fluid flow pressure demands. For use in pretreatment facilities at desalination plants, pipes carrying saline liquid could be manufactured with a coating of BAM sprayed onto the inside of pipes at a thickness of approximately 2 microns, which should keep salt deposits from forming on the inside of the pipes, thereby reducing or eliminating the use of chemical anti-scalants.

Figure 2:
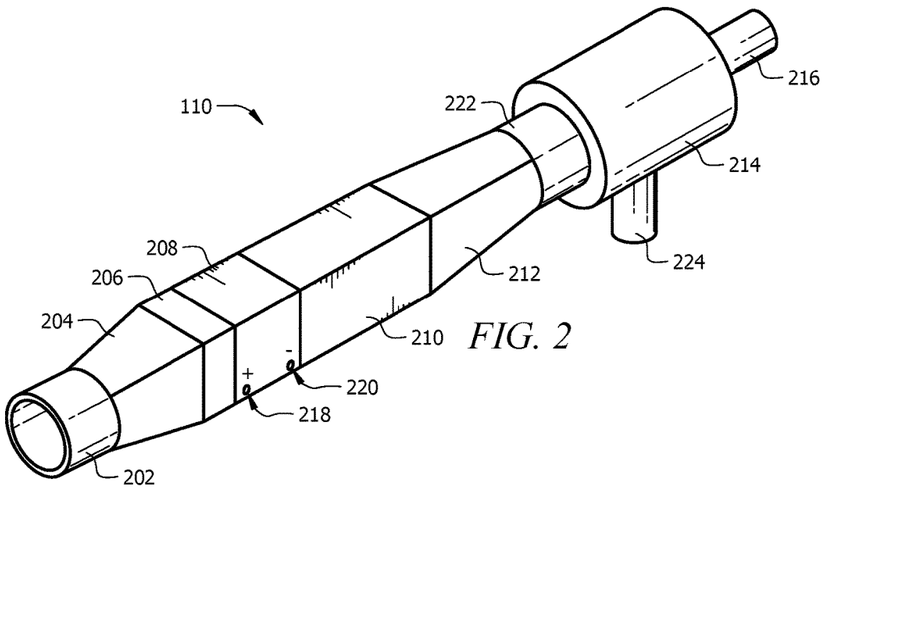
FIG. 2 is a perspective view of the major portions of an embodiment of a combined liquid transport and liquid desalination system.

FIG. 2 presents a perspective view of the major portions of an embodiment of a combined liquid transport and liquid desalination system (110). The fluid pump device (208) inlet connects to a main water pipeline (202) through an inflow manifold (206) and a pipe adapter (204). Output from the fluid pump device (208) is straightened by the outflow manifold (210) and pipe adapter (212). Power for operation of the fluid pump device is provided by an externally connected DC power source (218, 220). The outlet of the pipe adapter (212) is in fluid communication with the inlet (222) of the desalination device (214), which features a fresh water outlet (224) and a brine recovery outlet (216). Because of the high salinity nature of the liquids being transported and processed therethrough, the materials chosen for manufacture of these constituent components includes stainless steel alloy where appropriate, polymers, and other materials exhibiting necessary strength with anti-corrosive properties. Polymer coated metals may also be utilized and are within the scope of the claims.

Figure 3:
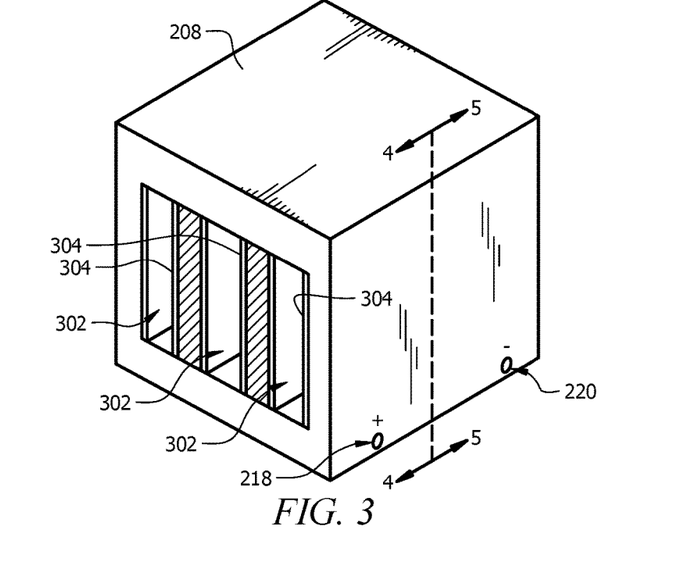
FIG. 3 is a detailed perspective view of an embodiment of the pump-system device portion of the liquid transport system embodiment.

FIG. 3 presents a detailed perspective view of an embodiment of the pump-system device (208) portion of the liquid transport system embodiment. Depicted is a multi-chambered device, the chambers for providing passage of the saline liquid therethrough. Defining the left and right walls of each chamber are conductive electrodes (302 and 304), accepting DC electrical power through external electrical connections (218 and 220). Defining the top and bottom of each chamber are permanent magnet arrays, details of which are presented and described in subsequent figures.

Figure 4:
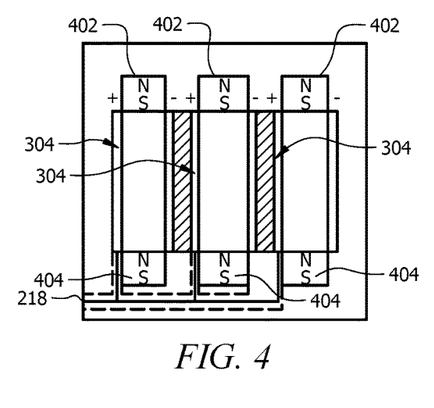
FIG. 4 is a detailed cross-sectional view of the pump system device in the "A" demarcation, highlighting the chambers and electrodes of the embodiment and the external power connection thereto.
Figure 5:
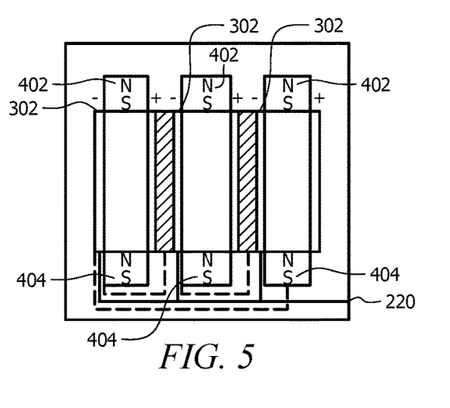
FIG. 5 is a detailed cross-sectional view of the other half of the pump-system device in the "B" demarcation, highlighting the chambers and electrodes of the embodiment and the external power connection thereto.

FIG. 4 presents a detailed cross-sectional view of the pump system device (208) in the "A" demarcation, highlighting the chambers and electrodes of the embodiment and the external power connection thereto. Shown are the permanent magnets (402 and 404) that form the top and bottom of each chamber. The external electrical connection (218) to energize the positive electrode plates (304) is a parallel connection to each. FIG. 5 presents a detailed cross-sectional view of the other half of the pump-system device (208) in the "B" demarcation, highlighting the chambers and electrodes of the embodiment and the external power connection thereto. Likewise, the external electrical connection (220) to energize the negative electrode plates (302) is a parallel connection to each.

Figure 6:
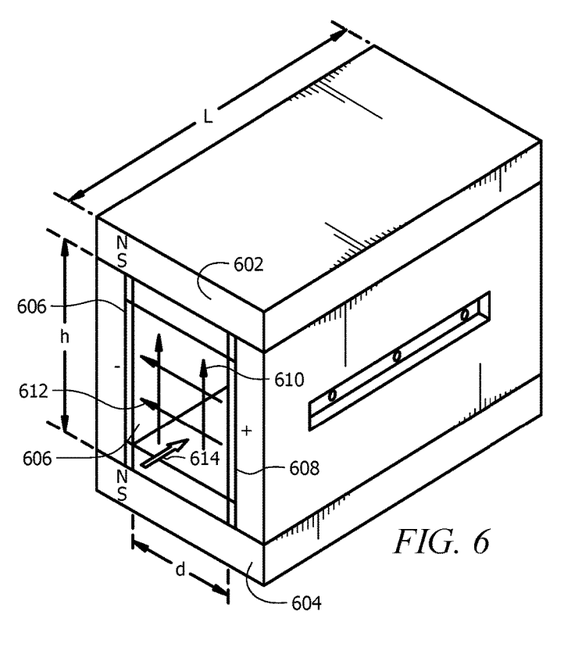
FIG. 6 is a detailed perspective view of a single pump chamber of the pump-system portion of the embodiment, highlighting the magnetic and electrical forces through which the Lorentz force is generated.

Consideration of the requirements for generating the Lorentz force to effect transport of the saline liquid can be determined by focus on a single pump chamber, given that each chamber operates in the same manner. FIG. 6 presents a detailed perspective view of a single pump chamber of the pump-system device embodiment, highlighting the magnetic and electrical forces through which the Lorentz force is generated. Again, the permanent magnet array forms the top (602) and bottom (604) of the chamber, with the magnetic field direction (610) substantially perpendicular to the fluid transport direction (608). Likewise, the when a DC electric potential is placed across the positive electrode plate (608) and the negative electrode plate (606) a current flow occurs across the saline liquid with the resultant electric field density (612) substantially perpendicular to the magnetic field direction (610) and the fluid transport direction (608). Again, basic underlying principles for MHD drive physics and generation of the Lorentz forces acting upon the saline liquid within the chamber are understood and presented in Takezawa, et al. (hereby incorporated by reference for all purposes) in greater detail.

The present embodiment differs markedly and unexpectedly through its use of high-strength permanent magnets for generation of the magnetic field (610). In the present embodiment the permanent magnet material is N52 neodymium. FIG. 6 presents a height (h), length (L), and distance (d) measurement that factors into the Lorentz forces and resultant flowrates and pressures. For example, with an N52 permanent magnet approximately 30.5 centimeters in length (L) and spaced by approximately 10.0 centimeters (h), in the presence of an electrical current field (612) it was observed that with a distance (d) of approximately 10.0 centimeters within the chamber a flow rate of approximately $1.26 \times 10^{-2}$ cubic meters per second at $6.89 \times 10^3$ Pascal. For a distance (d) of approximately 1.0 centimeters a flow rate of approximately $1.74 \times 10^{-2}$ cubic meters per second at $6.89 \times 10^4$ Pascal. For a distance (d) of approximately 1.0 millimeters a flow rate of approximately $1.26 \times 10^{-4}$ cubic meters per second at approximately $6.89 \times 10^5$ Pascal.

The embodiment utilizes permanent magnets of N52 strength or greater to generate the necessary non-impinging motive force to effect saline liquid transport. Adjustment of the dimensions for a given magnet strength will allow the overall delivery system to be tuned during operation. For example, saline content of the liquid under transport or other environmental factors (temperature, pressure, etc.) may affect flow rate and pressure. A constant feedback monitoring system may be utilized to adjust electric current field (612) strength and/or chamber distance (d) and/or chamber height (h) (i.e., distance between the magnets) in real time to adjust pump output. Fluid flow and pressure, distance, and electrical current sensors are well understood and readily employed for this purpose. Mechanical actuators may be utilized to control the necessary distance (d) and/or height (h) adjustments. While neodymium magnet materials are preferred, other permanent magnets of equivalent strength are also envisioned herein. Moreover, neodymium or other permanent magnets of lesser strength may be utilized if overall transport and desalination system requirements allow, which can be determined by measurement and monitoring as specified above.

Figure 7:
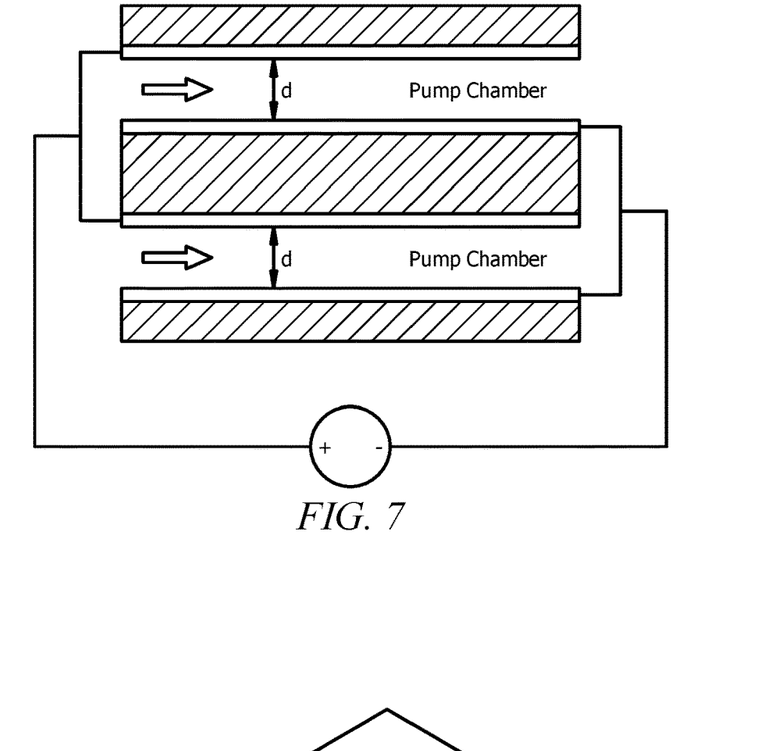
FIG. 7 is a schematic view of the electrodes creating the electrical potential for establishing the Lorentz force in the embodiment.

FIG. 7 presents a schematic view of the electrodes creating the electrical potential for establishing the Lorentz force in the embodiment. Highlighted is the distance (d) component of the pump chamber. When a saline liquid is present in the chamber, sufficient electrolyte causes a current flow thereby establishing the electric field (612) for the MHD effect. A DC voltage potential of up to 500 VDC may be utilized.

Figure 8:
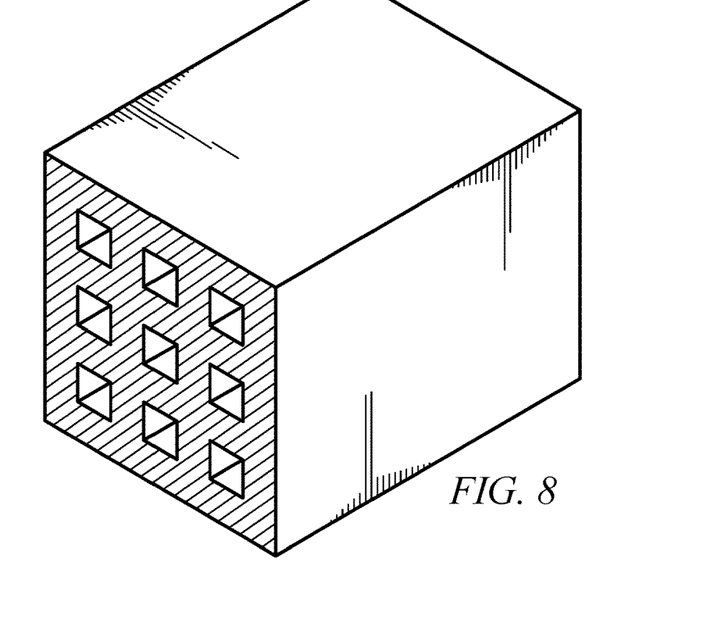
FIG. 8 is an alternate pump chamber arrangement in an alternate embodiment of the present invention.

While multiple side-by-side fluid transport chambers are described above, other configurations are possible and limited only by the magnet field strength, electric current field strength, and geometries of the pump chamber materials. FIG. 8 presents an alternate pump chamber arrangement in an alternate embodiment of the present invention. Depicted is a parallel pump chamber matrix having 9 liquid transport chambers. A greater or lesser number of chambers is possible depending on the application, as can be determined by one of ordinary skill with knowledge of the instant disclosure.

Figure 9:
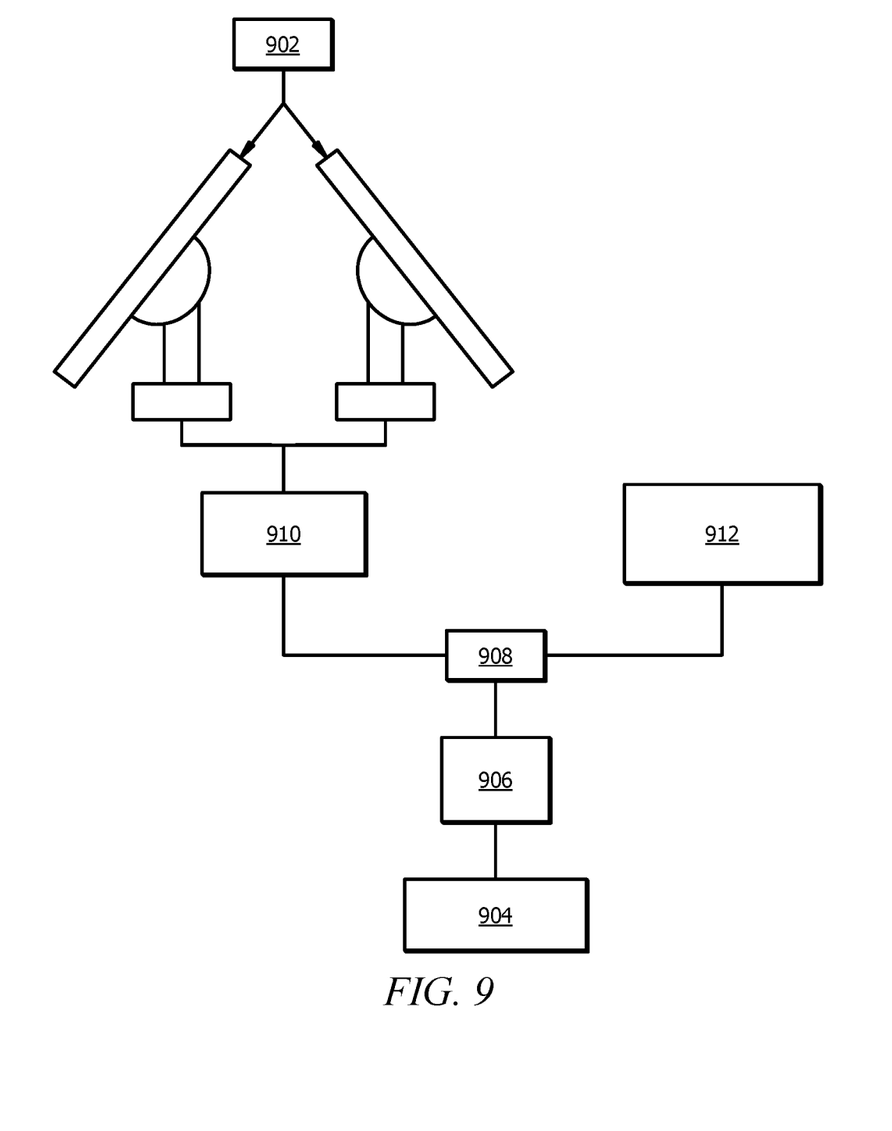
FIG. 9 is a block diagram of an embodiment of a solar power source for the liquid transport system embodiment, intended to provide the electric potential for the pump chamber electrodes.

Power requirements for each fluid pump device (208) is relatively minimal, and may be provided from standard reliable means. FIG. 9 presents a block diagram of an embodiment of a solar power source for the liquid transport system embodiment, intended to provide the electric potential for the pump chamber electrodes. In this embodiment solar panels (902) provide the primary power generation means with charge maintained and regulated by a lithium-ion battery bank (910). Backup power may be provided by a diesel/gasoline generator (912). The pump station connection (904) receives regulated power from a power control system (906) that may or may not utilize real-time system feedback as previously discussed to alter system operational characteristics. The power control system (906) ultimately switches automatically (908) between the battery (910) and generator (912) as needed in the event of power disruption. A connection to a power generation facility (not shown) may also be utilized if available, and can serve as an additional input to the battery bank (910) and/or may be directly switched (908).

Figure 10:
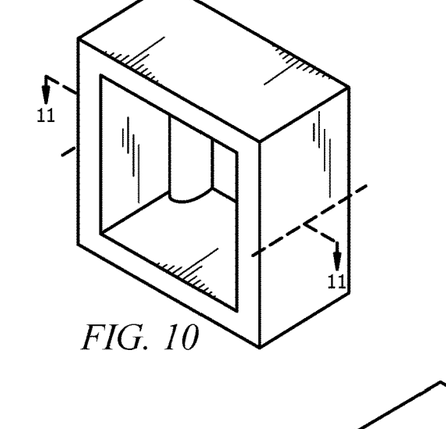
FIG. 10 is a perspective view of an embodiment of the inflow manifold through which the liquid under transport enters the liquid transport system.
Figure 11:
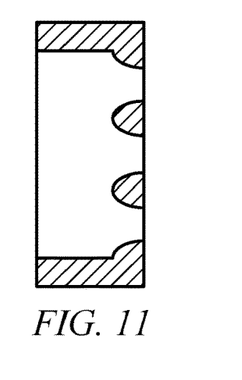
FIG. 11 is a cross-sectional view of the inflow manifold embodiment.
Figure 12:
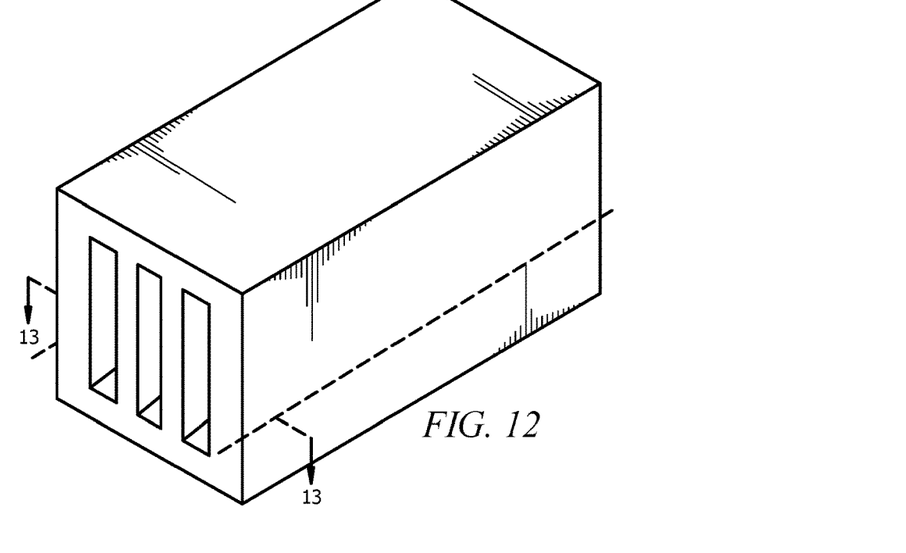
FIG. 12 is a perspective view of an embodiment of the outflow manifold through which the liquid under transport exits the liquid transport system.
Figure 13:
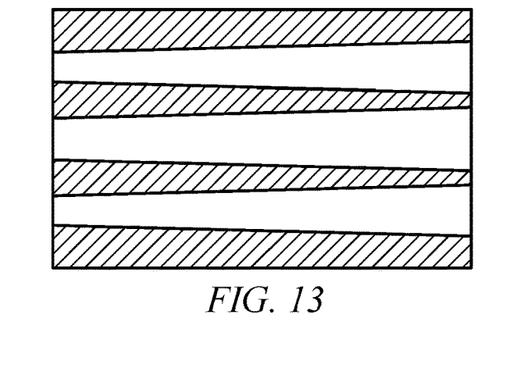
FIG. 13 is a cross-sectional view of the outflow manifold embodiment.

FIG. 10 presents a perspective view of an embodiment of the inflow manifold through which the liquid under transport enters the liquid transport system. While not absolutely necessary for operation, such an inflow manifold can work to reduce the turbulence of the saline liquid being transported, which will increase the efficiency at which the fluid pump device (208) operates. FIG. 11 presents a cross-sectional view of this inflow manifold embodiment, and highlights the shaped features that smooth the fluid stream. Likewise, FIG. 12 presents a perspective view of an embodiment of the outflow manifold through which the liquid under transport exits the liquid transport system. FIG. 13 presents a cross-sectional view of this outflow manifold embodiment, and shows the gradually opening exit fins that serve to further reduce the fluid turbulence. Either or both manifolds may be utilized as determined by system operational requirements, the determination of which is within the skill of one of ordinary skill given this disclosure.

Figure 14:
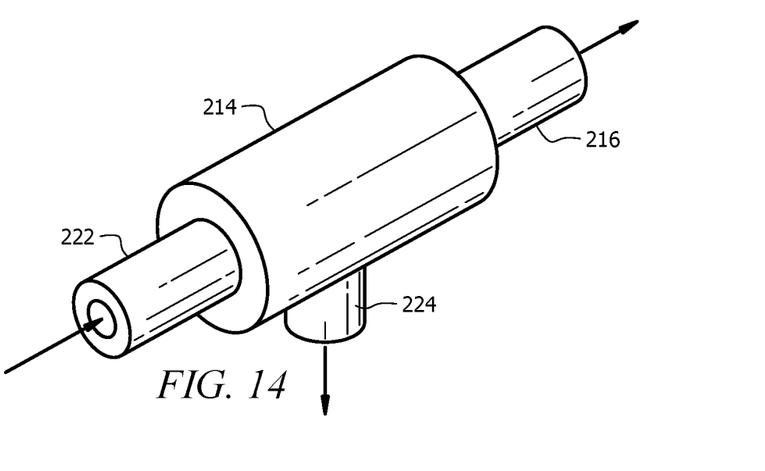
FIG. 14 is a detailed perspective view of the desalination/filtration portion of the desalination system device of the present embodiment.

In addition to the unique non-impinging motive force generation device, desalination is another important aspect. FIG. 14 presents a detailed perspective view of the desalination and filtration portion of the desalination system device (214) of the present embodiment. The device features at least a saline liquid intake (222), a fresh water outflow (224), and a brine recovery outflow (216).

Figure 15:
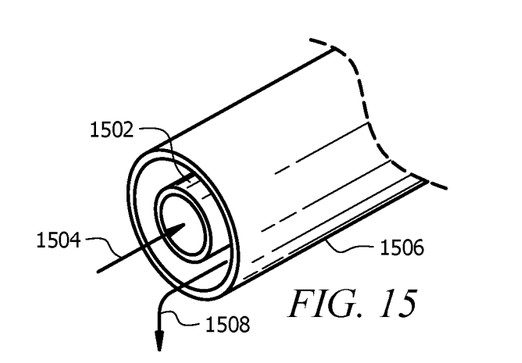
FIG. 15 is a close-up view of the filter cross section of the desalination system embodiment, highlighting the arrangement of the internal piping structure.

FIG. 15 presents a close-up view of the filter cross section of the desalination system embodiment, highlighting the arrangement of the internal piping structure. Within the desalination system device (214) body is a nested piping arrangement, with the inner pipe (1502) carrying the saline liquid (1504) and the outer pipe (1506) carrying the fresh water outflow (1508).

Figure 16:
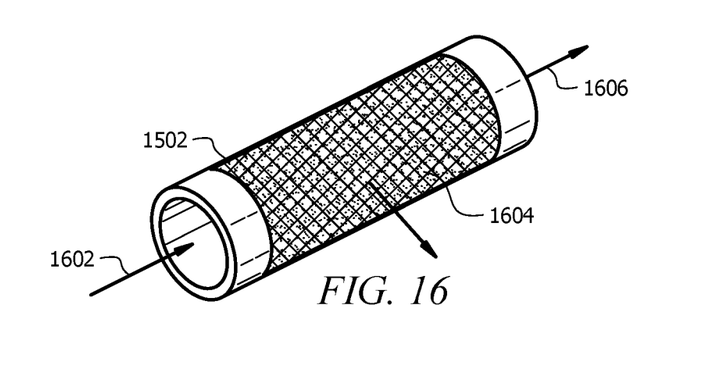
FIG. 16 is a close-up view of the inner desalination/filtration portion of the desalination system embodiment.

FIG. 16 presents a close-up view of the inner desalination/filtration portion of the desalination system embodiment. The desalination/filtration is accomplished preferably by use of a graphene filtration membrane, which exists as a one-atom-thick layer of carbon atoms that allow rapid water permeation. Consequently, saline and other particles may be readily removed at the stated fluid flow rates and pressures. Other desalination and filtration materials envisioned herein include use of carbon nanotube filtration membrane that, like graphene, features micro-pores through which water may readily pass while salt and other particles may be stripped therefrom. As saline liquid flows (1602) within the inner pipe, water permeates the desalination/filtration membrane (1604) and the remaining brine (1606) concentrates and passes along the fluid stream to the brine recovery outflow (216). The length of the inner tube and desalination/filtration membrane.

A benefit of moving the desalination process to the end of the transport stream is that it reduces the need for large, industrial scale desalination systems. Moreover, no single "mountain of salt" is created due to the desalination process, which given current EPA regulations can be difficult (and costly) to process. Instead, smaller, more manageable amounts of salt brine are created, which may have beneficial secondary uses such as salt used for road maintenance in colder climes, sea salt for consumption, etc.

Another use of the present invention involves power generation. Turbine generators can be placed inside the saline liquid water main pipes between fluid pump device stages, which may then be tapped externally to generate electricity for a remote area of use. If overall system flow is negatively affected, an additional fluid pump device (208) can be placed where the water exits the turbine to bring the flow rate back up to the original velocity it had before entering the turbine.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

We claim:

1. A system for transporting and desalinating a liquid, the system comprising:
    a saline liquid intake device in fluid communication with at least one fluid pump device, the fluid pump device comprising an inflow manifold and/or an outflow manifold, each manifold comprising a plurality of fins spaced to smooth the turbulence of a saline liquid flowing therethrough, and at least one chamber through which the saline liquid may flow, the fluid pump device capable of generating a non-impinging motive force to effect the movement and transport of the saline liquid through a piping system in fluid communication therewith; and
    a desalination device including a filtration medium for substantially reducing the salinity of the transported saline liquid by separation of a brine therefrom.

2. The system of claim 1, the at least one chamber of the fluid pump device further comprising:
    a permanent magnet array comprising a plurality of magnet segments arranged such that the resulting magnetic field direction within the chamber is substantially perpendicular to the direction of the saline liquid transport; and
    an electrode plate array arranged such that when a DC potential is applied therebetween the resulting electric current density direction is substantially perpendicular to the magnetic field direction and the direction of the saline liquid transport.

3. The system of claim 1, the at least one chamber of the fluid pump device further comprising:
    a permanent magnet array comprising a plurality of magnet segments of at least approximately N52 strength or greater, the permanent magnet array arranged such that the resulting magnetic field direction within the chamber is substantially perpendicular to the direction of the saline liquid transport; and
    an electrode plate array arranged such that when a DC potential is applied therebetween the resulting electric current density direction is substantially perpendicular to the magnetic field direction and the direction of the saline liquid transport.

4. The system of claim 1, the at least one chamber of the fluid pump device further comprising:
    a neodymium permanent magnet array comprising a plurality of magnet segments arranged such that the resulting magnetic field direction within the chamber is substantially perpendicular to the direction of the saline liquid transport; and
    an electrode plate array arranged such that when a DC potential is applied therebetween the resulting electric current density direction is substantially perpendicular to the magnetic field direction and the direction of the saline liquid transport.

5. The system of claim 1, the at least one chamber of the fluid pump device further comprising:
    an N52 or stronger neodymium permanent magnet array comprising a plurality of magnet segments arranged such that the resulting magnetic field direction within the chamber is substantially perpendicular to the direction of the saline liquid transport; and
    an electrode plate array arranged such that when a DC potential is applied therebetween the resulting electric current density direction is substantially perpendicular to the magnetic field direction and the direction of the saline liquid transport.

6. The system of claim 1, the fluid pump device further comprising:
    a monitoring system for adjusting a chamber dimension and/or an electrical current field strength in response to a saline liquid transportation characteristic to establish a desired saline liquid flow rate and/or flow pressure.

7. The system of claim 1, the desalination device filtration medium further comprising a graphene filtration matrix.

8. The system of claim 1, the desalination device filtration medium further comprising a carbon nanotube filtration matrix.

9. The system of claim 1, the desalination device further comprising a brine recovery outlet for removing the separated brine.

10. A method for transporting and desalinating a liquid, the method steps comprising:

with at least one fluid pump device comprising an inflow manifold and/or an outflow manifold, each manifold comprising a plurality of fins spaced to smooth the turbulence of a liquid flowing therethrough, imparting a motive force on a saline liquid through non-impinging means, whereby the liquid is forcibly transported through at least one chamber of the fluid pump device and through a piping system; and separating brine from the transported liquid through use of a desalination device to substantially reduce the salinity thereof.

11. The method of claim 10, the method steps further comprising:

providing a permanent magnet array comprising a plurality of magnet segments arranged such that the resulting magnetic field direction within the chamber is substantially perpendicular to the direction of the saline liquid being transported.

12. The method of claim 10, the method steps further comprising:

providing a permanent magnet array comprising a plurality of magnet segments arranged such that the resulting magnetic field direction within the chamber is substantially perpendicular to the direction of the liquid transport; and applying a DC potential across an electrode plate array arranged within the chamber such that the resulting electric current density field direction is substantially perpendicular to the magnetic field direction and the direction of the saline liquid being transported.

13. The method of claim 10, wherein the desalination device comprises a graphene filtration matrix.

14. The method of claim 10, wherein the desalination device comprises a carbon nanotube filtration matrix.

15. The method of claim 10, the method steps further comprising:

recovering the desalination brine for subsequent use.

16. The method of claim 10, the method steps further comprising:

monitoring at least one saline liquid transportation characteristic and adjusting a chamber dimension and/or an electrical current field strength in response to the saline liquid transportation characteristic to establish a desired saline liquid flow rate and/or flow pressure.

17. The method of claim 10, the method steps further comprising:

generating electricity using a turbine generator receiving motive force from the saline liquid transport flow.

* * * * *